United States Patent [19]
Rottmar et al.

[11] Patent Number: 4,886,938
[45] Date of Patent: Dec. 12, 1989

[54] ARRANGEMENT FOR LEADING A CABLE INTO A HOUSING

[75] Inventors: Werner Rottmar, Lörrach; Klaus Schmidt, Schopfheim, both of Fed. Rep. of Germany

[73] Assignee: Endress u. Hauser GmbH u. Co., Fed. Rep. of Germany

[21] Appl. No.: 89,351

[22] Filed: Aug. 25, 1987

[51] Int. Cl.$^4$ ............... H05K 5/00; H05K 17/945; H01H 36/00
[52] U.S. Cl. ............................. 174/52.1; 285/907
[58] Field of Search ............ 285/39, 318, 272, 280, 285/282, 901, 921, 907, 184, 305, 319, 320; 174/86, 50, 52.1; 403/377, 375, 345; 439/281, 278, 271, 587, 588, 589

[56] References Cited
U.S. PATENT DOCUMENTS

| 747,360 | 12/1903 | Barry | 285/317 |
|---|---|---|---|
| 1,031,587 | 7/1912 | Reisik | 285/39 X |
| 1,538,007 | 5/1925 | Schellin | 285/921 X |
| 1,822,260 | 9/1931 | Adams | 285/184 |
| 2,440,452 | 4/1948 | Smith | 285/317 |
| 2,557,507 | 6/1951 | Lang, Jr. | 285/184 X |
| 3,022,096 | 2/1962 | Schwartz | 285/907 X |
| 3,093,703 | 6/1963 | Zavertnik | 174/86 |
| 4,402,234 | 9/1983 | Malarz et al. | 285/184 |

FOREIGN PATENT DOCUMENTS

| 2713213 | 3/1978 | Fed. Rep. of Germany . | |
| 1566089 | 4/1980 | Fed. Rep. of Germany . | |
| 2758969 | 10/1984 | Fed. Rep. of Germany . | |
| 3439784 | 4/1986 | Fed. Rep. of Germany . | |
| 3614198 | 10/1987 | Fed. Rep. of Germany . | |
| 337056 | 9/1936 | Italy | 285/184 |
| 8202621 | 1/1984 | Netherlands | 439/271 |

Primary Examiner—Randolph A. Reese
Assistant Examiner—Anthony Knight
Attorney, Agent, or Firm—Barnes & Thornburg

[57] ABSTRACT

Illustrated and described is an arrangement for leading a cable into a housing, preferably a cylindrical housing, for electrical or electronic devices. The housing is provided with a cylindrical housing part made detachably for connection of the connection cable. The housing part is divided into two parts, the lead-in sleeve 4 and a cap 3 covering the electrical connection elements. The cap 3 is connected by means of a connection part 10 to the housing 2 in the interior of which the electronic components are accommodated. The cap 3 is supported by axial portions of the connection part 10 and withdrawable from the latter in axial direction. The arresting is done by means of a spring element 21 which engages into a groove 22 of the connection part 10. Further grooves 26 which are arranged at the periphery of the inner wall 19 of the cap 3 and into which a right parallelepipedic protrusion 27 engages prevent turning of the cap 3 with respect to the housing 2. The lead-in sleeve 4 is mounted for infinitely variable rotation in the rear wall of the cap 3. Thus, the connection cable can be introduced into the device in accordance with the requirements at the place of use in any angular position, from an axial position to a position angled at 90° to the longitudinal direction of the electrical device.

9 Claims, 2 Drawing Sheets

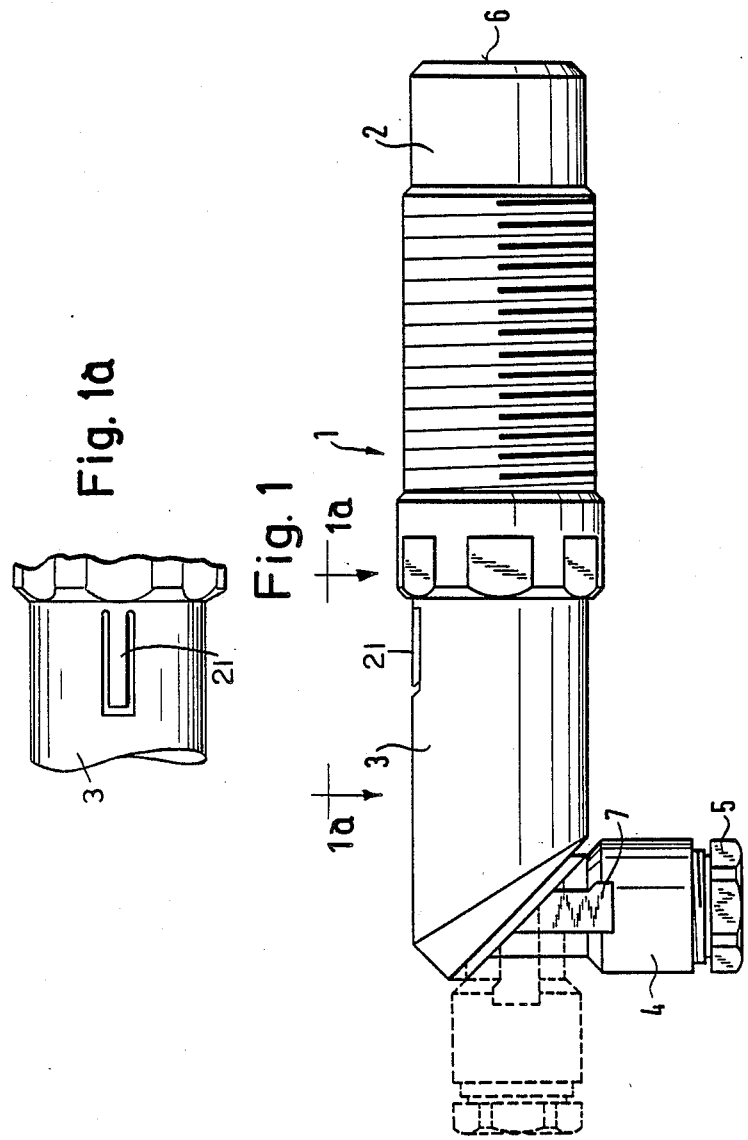

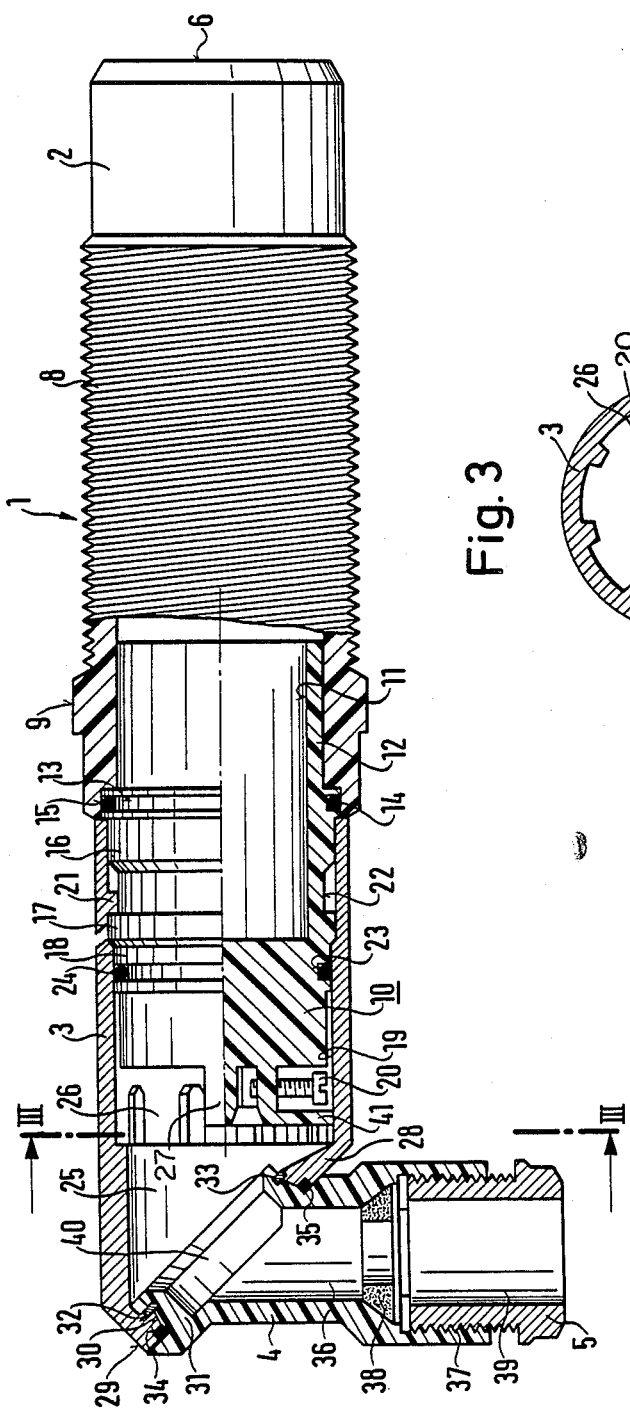
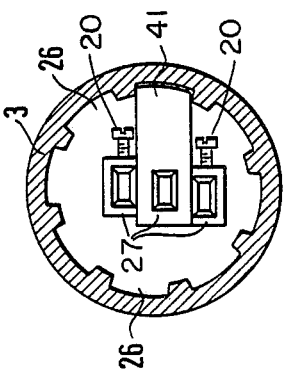

ARRANGEMENT FOR LEADING A CABLE INTO A HOUSING

The invention relates to an arrangement for leading a connection cable into a housing of an electrical or electronic device, for example a measured value pickup. Such measured value pickups (referred to simply hereinafter as sensors) have as a rule a cylindrical housing in which the electrical/electronic components for the measured value pickup, measured value transformation and the terminal elements for the connecting lead to the power supply of the sensor and the signal transmission from the sensor to the evaluation device are accommodated. Sensors are known which are provided with a fixedly laid, i.e. non-detachable, cable. Relatively large sensors as a rule are designed so that their connecting cable is connected at the place of use in accordance with their purpose; the invention relates to a sensor of the latter type.

The use of such sensors is frequently made difficult in that at the location where they are employed only a restricted space is available for providing the sensor and its connection and consequently the connecting cable must be laid depending on the space requirement.

DE-PS No. 2,758,969 discloses a prior art device which attempts to overcome these difficulties in that the housing is divided at an angle of 45° to the housing longitudinal axis into two (or more) housing parts, each housing part, in the interior of which terminal elements for the connection cable are disposed, being selectively reversible through 180° to permit introduction of the connection cable in the axial direction or in a direction at 90° to the housing longitudinal axis. The housing parts are connected with a single connecting screw extending at an angle of 45° to the housing longitudinal axis.

The disadvantage of this prior art device lies in that the introduction of the connection cable is possible only in two directions, i.e. axially or offset radially 90°, and this is a disadvantage with the very frequently restricted space conditions at the place of use of the sensors. Furthermore, for each change of the lead direction of the connection cable the terminal housing must be disconnected from the other housing parts, turned round and again attached.

According to the teaching of German patent No. 3,439,784 an arrangement for leading a connection cable into an electrical/electronic housing is proposed which permits the leading of the connection cable in infinitely variable manner from any desired direction from axially to 90° radially to the longitudinal axis of the housing without the housing parts having to be separated from each other and the connection lines having to be sealed by cable ferrules selected according to their outer diameter.

Although this essentially solves the problem of leading the connection cable up in infinitely variable manner from any desired direction from axially to 90° radially to the longitudinal axis of the housing without having to separate the housing parts from each other it may happen in practical use of a sensor according to this teaching under difficult restricted space conditions that the single screw passing through the outer case of the housing after installation of the sensor is no longer accessible. This may be the case in particular if the sensor is used for detecting the filling level in a container and is therefore screwed by means of a thread into a cylindrical protection housing which is fixedly connected to the container wall and traverses the latter.

The problem underlying the invention is to provide an arrangement for leading a connection cable into an electrical/electronic housing according to DE-PS No. 3,439,784 which is free from any screw gland connecting the housing parts and in which each housing part in whose interior the terminal elements for connecting a connection cable are located is detachable in the direction of the housing longitudinal axis.

According to the invention this problem is solved by the features characterized in claim 1.

Advantageous embodiments of the invention will be apparent from the following description with the aid of the attached drawings, wherein:

FIG. 1 shows a housing of a sensor according to the invention.

FIG. 1a is partial view through lines 1a of FIG. 1.

FIG. 2 is a partial section through the housing of FIG. 1.

FIG. 3 is a radial section A–B through the housing of FIG. 2.

In FIG. 1, 1 denotes a sensor which for the sake of explanation is assumed to be a capacitive sensor. Said sensor comprises a cylindrical housing which consists of three housing parts 2, 3, 4. In the part 2 the electrical components necessary for picking up the measured value and converting said value are accommodated. The active part with the capacitive electrode is located directly behind the end face 6; furthermore, the sensor comprises a cap 3. The cap 3 encloses the components with which the connection cable, not shown, is electrically connected to the sensor.

Furthermore, the sensor has a lead-in bushing 4 for introduction of the connection cable and accommodating the cable ferrule 5.

As shown in FIG. 1 in dashed line the lead-in bushing or sleeve 4 can be pivoted about its axis so that it can assume in infinitely variable manner any desired position from an axial position in the longitudinal direction of the sensor 1 to a radially angled position at 90°. It is therefore possible to appropriately lay and connect the connection cable in the frequently very constricted space conditions at the place of use of the sensor. To facilitate pivoting of the lead-in sleeve 4 two key faces 7 are formed thereon. FIG. 2 shows a section through the housing parts 2 (partial), 3, and 4, and the cable ferrule 5 with all details of the invention. The housing 2 surrounds a pc board which is not shown and on which the electronic components for picking up and transforming the measured value are accommodated. The housing 2 is of plastic, advantageously of polycarbonate. The housing 2 comprises a thread 8 with the aid of which the sensor 1 can be fixedly mounted at the place of use. For example, it can be screwed with the aid of the thread 8 into the internal thread of a cylindrical protection housing which projects into the interior of a container and is fixedly connected to the container wall. The screwing in is done with the aid of integrally formed key faces 9. Tightly connected to the housing 2 is the connection part 10. The connection part 10 is in turn advantageously made of polycarbonate. On the side facing the active end face 6 the connection part 10 comprises a cylindrical recess 11 which is intended for receiving a portion of the pc board, not shown, comprising the electronic components. The outer cylindrical surface of the connection part 10 comprises at the side facing the active end face 3 a portion 12 which extends axially. The diameter thereof is selected so that it is in a light interference fit with the cylindrical inner face of the housing 2. An annular groove 13 is provided to receive an O ring 14. To form the groove 13 the connection part 10 has a short cylindrical portion of diameter increased with respect to the cylindrical portion 12. The housing part 2 is further provided with an annular recess 15 whose diameter is chosen such that on introduction of the cylindrical portion 12 of the connection member 10 into the hollow cylindrical housing 2 the O ring 14 is pressed by means of the bottom of the groove 13 against the axial wall of the recess 15 in such a manner that it forms a sealing joint between the housing parts. After assembling together the parts 2 and 10 the space formed by the parts 2 and 10 and surrounding the electronic components can be filled with a potting or casting composition.

In the direction away from the active end face 6 of the sensor 1 following the connection part 10 extend three further short cylindrical portions 16, 17, 18. The diameter of these axial portions is chosen so that it corresponds to the diameter of opposite axial portions of the cylindrical recess 19 of the cap 3. As apparent from FIG. 2 the cap 3 is supported by the axial portions 16, 17, 18.

The cylindrical portions 16, 17, 18 form with the opposite cylindrical portions of the cap 3 a firm sliding fit. Now, it is readily apparent from FIG. 2 that the cap 3 surrounding the electrical connection components 20 for the connection cable, not shown, according to the invention can be withdrawn in the axial direction from the connection part 10 and again fitted on without a screw connection having to be undone and again tightened. To prevent unintentional detaching of the cap 3 from the connection part 10 said cap 3 is provided with a spring nose-shaped detent 21 which engages into the groove 22 of the connection part 10. The parts 3 and 10 are disengaged in that the spring nose-like detent 21 is slightly raised by means of a screwdriver or similar tool and on withdrawal of the cap 3 jumps over the diameter of the cylindrical portion 17. Integrally formed on the connection part 10 is a further groove 23; it serves to receive the O ring 24. The latter is pressed when the cap 3 is pushed onto the connection part 10 by means of the bottom of the groove 23 against the inner wall of the cap 3 and thus seals the electrical connection space 25 tightly from the environment.

Integrally formed on the end opposite the active end face 6 on the connection part 10 are right protrusions 27; they serve to receive the electrical connection elements 20 for the connection cable which is not shown.

The cap 3 further comprises at the end of the hollow cylindrical recess 19 remote from the active end face 6 a portion with symmetrically disposed equisized grooves 26 distributed uniformly along the inner face (FIG. 3); said grooves extend in axial direction. As apparent from FIG. 3 the middle one of the right parallelepipedic protrusions 27 intended to receive the electrical connection elements is formed with an extension 41 that extends directly up to the inner wall of the cap 3 and in each case engages in one of the grooves 26. The width of the extension 41 corresponds to the groove width of the grooves 26 and the end of the extension 41 facing the inner wall of the cap 3 is made arcuate. The radius of said arc is chosen so that it is only a few tenths of a millimeter smaller than the radius of the groove bottom.

Thus, when being pushed onto the connection part 10 the cap 3 can be guided by means of the grooves 26 and the extension 41 of the central protrusion 27 and then arrested in its position with respect to the housing 2. The arresting has the advantage that the cap 3 when the lead-in sleeve is pivoted cannot turn about its axis, giving a greater resistance to stretching or even destruction of the connection cable.

On the side remote from the active end face 6 the cap 3 comprises an elliptical rear face 28 extending at an angle of 45° to the housing longitudinal axis; said rear face 28 merges smoothly from an elliptical semicircle into one 29 which extends in axial direction inclined with respect to the longitudinal axis of the sensor 1 by 45°. The rear face 28 is interrupted by a cylindrical recess 30 whose axis extends at an angle of 45° to the longitudinal axis of the sensor 1. The surface of the cylindrical recess 30 is divided into portions of various diameter.

In a first portion of reduced diameter facing the connection space 25 a groove of square cross-section is formed. In a second portion of greater diameter remote from the connection space 25 a groove of square cross-section is also formed. In the rear face 28 of the cap 3 the lead-in sleeve 4 is secured, the latter also being made from plastic, advantageously polycarbonate. The lead-in sleeve 4 is secured in the rear face 28 in that said lead-in sleeve 4 is provided with an annular cylindrical collar 31. The annular cylindrical collar 31 is so disposed that its axis forms with both the longitudinal axis of the sensor 1 and the longitudinal axis of the lead-in sleeve 4 an angle of 45°. At its outer surface the annular cylindrical collar 31 is also provided with portions of smaller and larger diameter which fit in form-locking manner with the portions with which the wall face of the cylindrical recess 30 is provided. In form-locking manner with the square grooves of the wall face 30 the collar 31 likewise has annular cylindrical grooves of square cross-section. The position of the lead-in sleeve 4 in the rear face 28 of the cap 3 is such that the two square grooves lie opposite each other and thus for annular grooves of rectangular cross-section. Mounted in the first groove 32 facing the connection space 25 is a spring ring 33 and forms the rotatable holder of the lead-in sleeve 4 in the cap 3. In the second groove 34 remote from the connection space 25 an O ring 35 is arranged whose purpose is to seal the connection space 25 from the environment.

The O rings 14, 24, 35 may be commercially usual O rings made of Viton.

As readily apparent from FIG. 2 the lead-in sleeve 4 can be turned about the axis of the cylindrical collar 31 so that said lead-in sleeve 4 can assume in infinitely variable manner any desired angular position with respect to the longitudinal axis of the sensor 1 and this makes it possible to lay the connection cable appropriately in accordance with the frequently restricted space conditions at the place of use of said sensor 1.

The connection cable (not shown) is led in through the bore 36 of the lead-in sleeve 4. The bore 36 is provided at its inner side with a thread 37 which serves to receive the cable ferrule 5. The latter may be a commercially available cable ferrule. The purpose of the cable ferrule is to seal the connection space of the cable from the environment with simultaneous passage of the cable. This is done with the aid of a conical seal 38. This is a commercially available part made from soft flexible material. The interior 36 of the lead-in sleeve 4 has the form of a cylinder cut off at an angle; this form serves for easier introduction of the connection cable into the connection space 25. It establishes the connection to the cylindrical bushing 40 whose axis coincides with that of the cylindrical recess 30 and of the annular cylindrical collar 31. Introduction of the connection cable, not illustrated, is now through the cylindrical openings 39, 36, 40. According to a feature of the invention the introduction and connection of the connection cable with the aid of the stepwise arrest-ability of the cap 3 on the connection part 10 can be substantially facilitated in that the rear face 28 extending at an angle of 45° to the longitudinal axis of the sensor 1 and thus the bushing 40 under constricted connection conditions can be arrested in different positions in particular favorable for the lead-in and connection of the connection cable without on subsequent pivoting of the lead-in sleeve 4 the cap 3 being able to assume another position with respect to the housing 2.

We claim:

1. Arrangement for leading a cable into a housing which comprises a first housing part accommodating electrical components and carrying an axially extending connection part having connection elements for the cable conductors, a cap-like second housing part enclosing said connection elements, and a third housing part attached to said second housing part for introduction of said cable into said second housing part, in which arrangement said cap-like second housing part encloses said axially extending connection part in a sliding fit and comprises a detent engaging a circumferential groove in said connection part whereby said cap-like second housing part is held against axial displacement but can be detected by axial withdrawal from said connection part upon disengagement of said detent, and in which arrangement said cap-like second housing part comprises at its inner face at least one axial groove and said connection part comprises at least one protrusion which engages into said axial groove, whereby said cap-like second housing part is fixed on said connection part in a predetermined angular position.

2. Arrangement according to claim 1 in which said cap-like second housing comprises at its inner face a plurality of axial grooves and said at least one protrusion of said connection part selectively engages one of said axial grooves whereby said gap-like second housing part is fixed on said connection part in a selected one of a plurality of predetermined angular positions.

3. Arrangement according to claim 1 in which said connection part comprises axially spaced cylindrical portions on which said cap-like second housing part bears.

4. Arrangement according to claim 1 in which a resilient sealing ring is disposed between said second housing part and said connection part.

5. Arrangement according to claim 1 in which the inner faces of said cap-like second housing part and an end face of said connection part define within said second housing part a connection space permitting the electrical connections of the cable conductors.

6. Arrangement according to claim 5 in which the connection part comprises at its end face protrusions accommodating the connection elements for the cable conductors.

7. Arrangement according to claim 1 in which a resilient sealing ring is disposed between said connection part and said cap-like second housing part.

8. Arrangement according to claim 1 in which said cap-like second housing part has an annular cylindrical opening and said third housing part has an annular cylindrical collar rotatably received in said annular cylindrical opening, said opening and said collar having mutually matching portions of different diameters.

9. Arrangement according to claim 8 in which said annular cylindrical opening and said annular cylindrical collar comprise matching opposite grooves in which a spring ring is disposed for rotatably holding said third housing part in the opening of said second housing part.

* * * * *

UNITED STATES PATENT AND TRADEMARK OFFICE
CERTIFICATE OF CORRECTION

PATENT NO. : 4,886,938

DATED : December 12, 1989

INVENTOR(S) : Werner Rottmar and Klaus Schmidt

It is certified that error appears in the above-identified patent and that said Letters Patent is hereby corrected as shown below:

On the bibliography page, under the heading "FOREIGN PATENT DOCUMENTS", please delete "1566089  4/1980  Fed. Rep. of Germany", and insert therefor --1566089  4/1980  Great Britain--;

At column 3, line 50, after the word "are", please delete the word "right";

At column 3, line 58, after the word "the" (second occurrence), please delete the word "right"; and At column 5, line 35, please delete "detected" and insert therefor --detached--.

Signed and Sealed this

Twenty-third Day of October, 1990

Attest:

HARRY F. MANBECK, JR.

*Attesting Officer*     *Commissioner of Patents and Trademarks*